US012267264B2

(12) United States Patent
Sakhnini et al.

(10) Patent No.: US 12,267,264 B2
(45) Date of Patent: Apr. 1, 2025

(54) REFERENCE SIGNAL BASED INFORMATION USING INDEX MODULATION

(71) Applicant: QUALCOMM Incorporated, San Diego, CA (US)

(72) Inventors: Iyab Issam Sakhnini, San Diego, CA (US); Tao Luo, San Diego, CA (US); Junyi Li, Fairless Hills, PA (US); Mahmoud Taherzadeh Boroujeni, San Diego, CA (US); Wanshi Chen, San Diego, CA (US); Qiang Wu, San Diego, CA (US); Jun Ma, San Diego, CA (US); Linhai He, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 17/450,771

(22) Filed: Oct. 13, 2021

(65) Prior Publication Data
US 2022/0123890 A1 Apr. 21, 2022

Related U.S. Application Data

(60) Provisional application No. 63/093,051, filed on Oct. 16, 2020.

(51) Int. Cl.
*H04L 5/00* (2006.01)
(52) U.S. Cl.
CPC .................... *H04L 5/0048* (2013.01)
(58) Field of Classification Search
CPC ... H04L 5/0048; H04L 5/0051; H04L 5/0007; H04L 1/0041; H04L 27/2657;
(Continued)

(56) References Cited

U.S. PATENT DOCUMENTS 10,716,020 B2 * 7/2020 Onggosanusi ........ H04L 5/0094
11,032,837 B2 * 6/2021 Baldemair ............ H04L 5/0007
(Continued)

FOREIGN PATENT DOCUMENTS

CN 115804195 A * 3/2023 ......... H04L 27/2657
CN 116669196 A * 8/2023 ............... H04L 1/08
(Continued)

OTHER PUBLICATIONS

Ericsson: "New SID on Support of Reduced Capability NR Devices", 3GPP TSG RAN Meeting #86, RP-193238, Sitges, Spain, Dec. 9-12, 2019, 5 Pages.
(Continued)

*Primary Examiner* — Ayaz R Sheikh
*Assistant Examiner* — Louis Samara
(74) *Attorney, Agent, or Firm* — QUALCOMM Incorporated

(57) ABSTRACT

An apparatus, e.g., a UE, for transmission of information modulated onto RSs using index modulation is disclosed. The UE may receive, from a base station, a configuration of one or more RS resources of an RS resource set. The one or more RS resources may be associated with an index modulation technique including a plurality of UL or DL information bits. The UE may transmit, to the base station, or receive, from the base station, the plurality of UL or DL information bits. The plurality of UL or DL information bits may include at least one of one or more first bits or one or more second bits. At least one of the one or more RS resources may be selected based on at least one of the one or more first bits or the one or more second bits.

27 Claims, 14 Drawing Sheets

(58) Field of Classification Search
CPC ... H04W 24/08; H04W 52/228; H04W 72/12; H04B 17/345; H04B 7/0408; H04B 1/7097
See application file for complete search history.

(56) References Cited

U.S. PATENT DOCUMENTS

2018/0302896 A1\* 10/2018 Nayeb Nazar ....... H04B 1/7097
2019/0075524 A1\* 3/2019 Zhou ..................... H04L 5/0098
2020/0146068 A1\* 5/2020 Islam .................... H04W 74/0833
2021/0203443 A1\* 7/2021 Na ......................... H04W 72/12
2021/0204293 A1\* 7/2021 Shao ..................... H04W 76/11

FOREIGN PATENT DOCUMENTS

| EP | 4236500 A2 * | 8/2023 | ........... H04B 17/328 |
| KR | 20190039282 A * | 4/2019 | |
| KR | 20230078659 A * | 6/2023 | |
| WO | WO-2020143734 A1 * | 7/2020 | |

OTHER PUBLICATIONS

Mao T., et al., "Novel Index Modulation Techniques: A Survey", IEEE Communications Surveys & Tutorials, vol. 21, No. 1, First Quarter 2019, pp. 315-348.

\* cited by examiner

| RS | CSI-RS/DMRS/SRS/PRACH |
|---|---|
| Use of IM | Use/Nonuse |
| Bit split of first bits or second bits | m:n |
| Modulation of first bits | UL or DL beams/Subcarriers/Frequency locations/Time symbols/… |
| Modulation of second bits | RS sequence/RS port/RS density or comb structure/Time domain (TD) or frequency domain (FD) allocation/Resource mapping/… |
| Content of first bits | Control information/Control information types |
| Content of second bits | Control information/Not Used |
| Periodicity of RS | Periodic/Aperiodic |

FIG. 5

| Information bits | First bits (16 bits) | 1 | 0 | 0 | 0 | 1 | 1 | 1 | 0 | 0 | 0 | 0 | 1 | 1 | 1 |
|---|---|---|---|---|---|---|---|---|---|---|---|---|---|---|---|
| | Second bits (16 bits) | 01 | | | 10 | 00 | 11 | | 00 | | | | 10 | 11 | 01 |
| CSI-RS Tx | TCI activation (based on part 1) | 0 | 1 | 2 | 3 | 4 | 5 | 6 | 7 | 8 | 9 | 10 | 11 | 12 | 13 | 14 | 15 |
| | CSI-RS sequence (based on part 2) | 1 | | | 2 | 0 | 3 | | 0 | | | | 2 | 3 | 1 |

▓ = CSI-RS sent
☐ = CSI-RS not sent

FIG. 7

REFERENCE SIGNAL BASED INFORMATION USING INDEX MODULATION

CROSS REFERENCE TO RELATED APPLICATION(S)

This application claims the benefit of and priority to U.S. Provisional Application Ser. No. 63/093,051, entitled "Reference Signal Based Information Using Index Modulation" and filed on Oct. 16, 2020, which is expressly incorporated by reference herein in its entirety.

TECHNICAL FIELD

The present disclosure relates generally to communication systems, and more particularly, to transmission of control information within reference signals (RSs) using an index modulation technique.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus, e.g., a user equipment (UE), are provided. The UE may receive, from a base station, a configuration of one or more RS resources of an RS resource set. The one or more RS resources may be associated with an index modulation technique including a plurality of uplink (UL) or downlink (DL) information bits. The UE may transmit, to the base station, or receive, from the base station, the plurality of UL or DL information bits. The plurality of UL or DL information bits may include at least one of one or more first bits or one or more second bits. At least one of the one or more RS resources may be selected based on at least one of the one or more first bits or the one or more second bits.

In another aspect of the disclosure, a method, a computer-readable medium, and an apparatus, e.g., a base station, are provided. The base station may configure one or more RS resources of an RS resource set. The one or more RS resources may be associated with an index modulation technique including a plurality of DL or UL information bits. The base station may transmit, to a UE, or receive, from the UE, the plurality of DL or UL information bits. The plurality of DL or UL information bits may include at least one of one or more first bits or one or more second bits. At least one of the one or more RS resources may be selected based on at least one of the one or more first bits or the one or more second bits.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating an example configuration for transmission of information with IM or RS.

FIG. 7 is a diagram illustrating SD-IM and RS sequence-based modulation.

DETAILED DESCRIPTION

Figure 1:
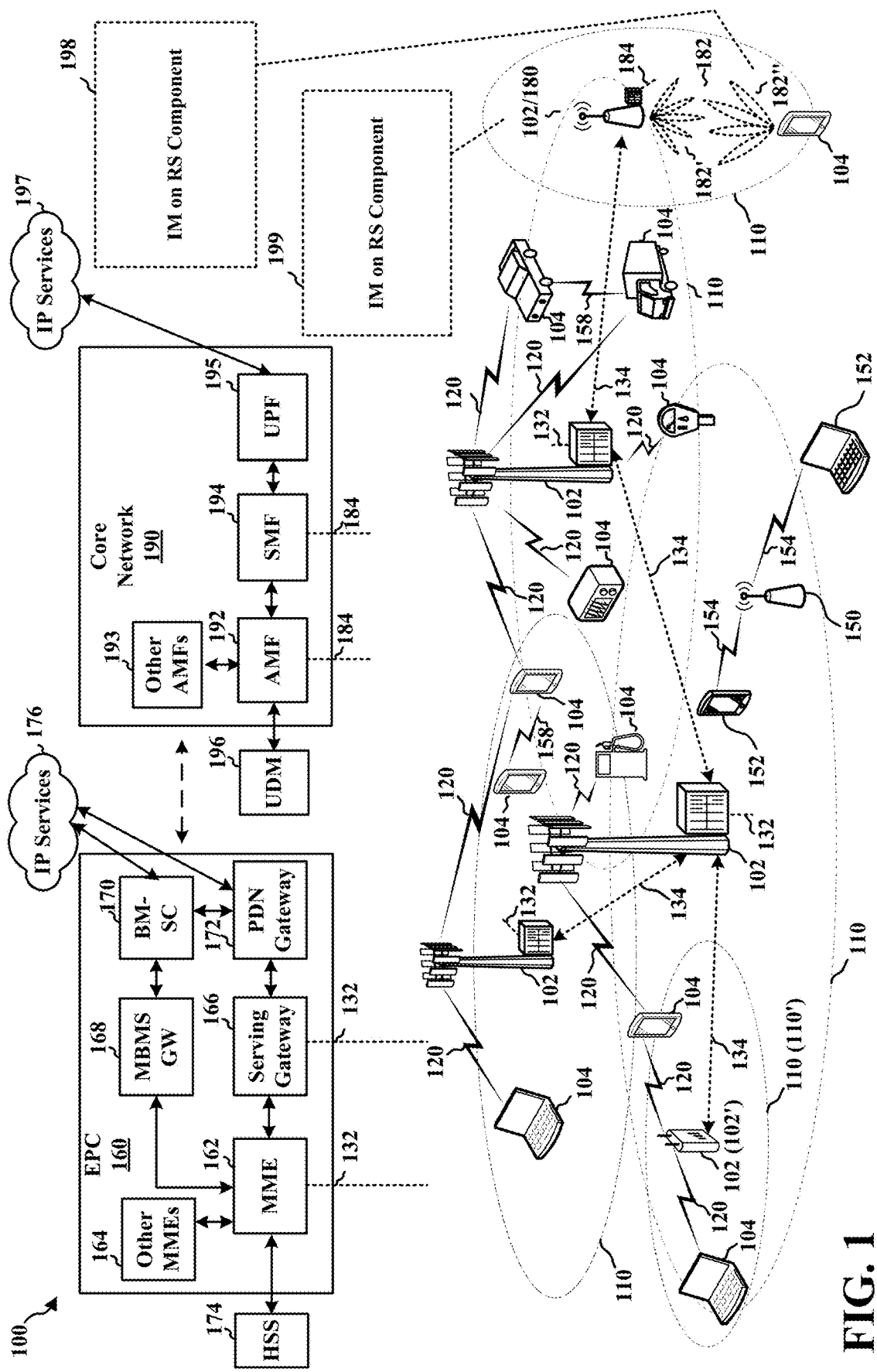
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an IM on RS component 198 that assists with transmission of information modulated onto reference signals (RSs) using index modulation (IM) techniques. The IM on RS component 198 may be configured to receive, from a base station, a configuration of one or more reference signal (RS) resources of an RS resource set. The one or more RS resources may be associated with an index modulation technique including a plurality of uplink (UL) or downlink (DL) information bits. The IM on RS component 198 may also be configured to transmit, to the base station, or receive, from the base station, the plurality of UL or DL information bits. The plurality of UL or DL information bits may include at least one of one or more first bits or one or more second bits. At least one of the one or more RS resources may be selected based on at least one of the one or more first bits or the one or more second bits.

In certain aspects, the base station 180 may include an IM on RS component 199 that assists with transmission of information modulated onto reference signals (RSs) using IM techniques. The IM on RS component 199 may be configured to configure one or more reference signal (RS) resources of an RS resource set. The one or more RS resources may be associated with an index modulation technique including a plurality of downlink (DL) or uplink (UL) information bits. The IM on RS component 199 may also be configured to transmit, to a user equipment (UE), or receive, from the UE, the plurality of DL or UL information bits. The plurality of DL or UL information bits may include at least one of one or more first bits or one or more second bits. At least one of the one or more RS resources may be selected based on at least one of the one or more first bits or the one or more second bits. Although the following description may be focused on 5G NR, the concepts described herein may be applicable to other similar areas, such as LTE, LTE-A, CDMA, GSM, and other wireless technologies.

Figure 2:
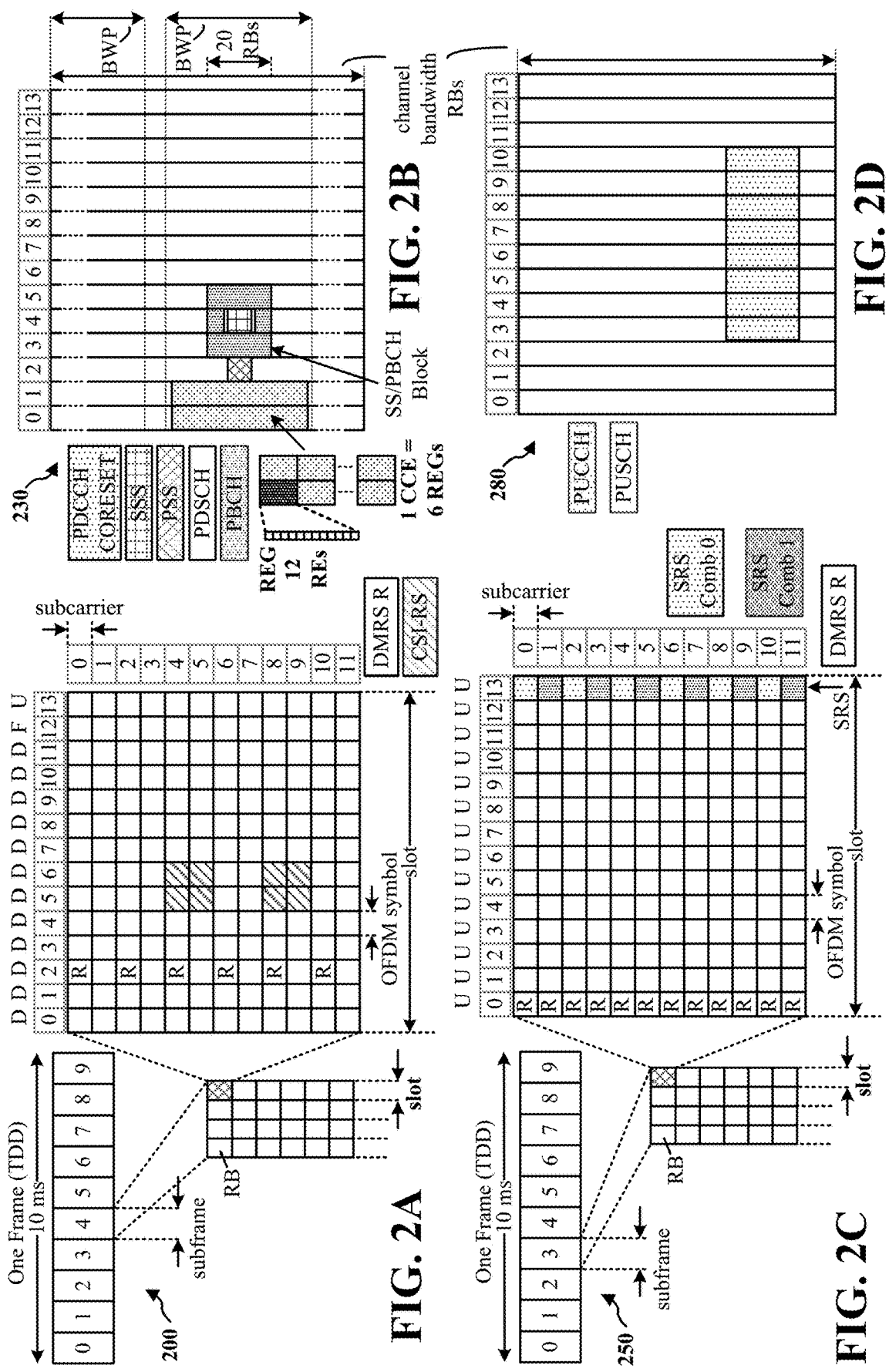
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
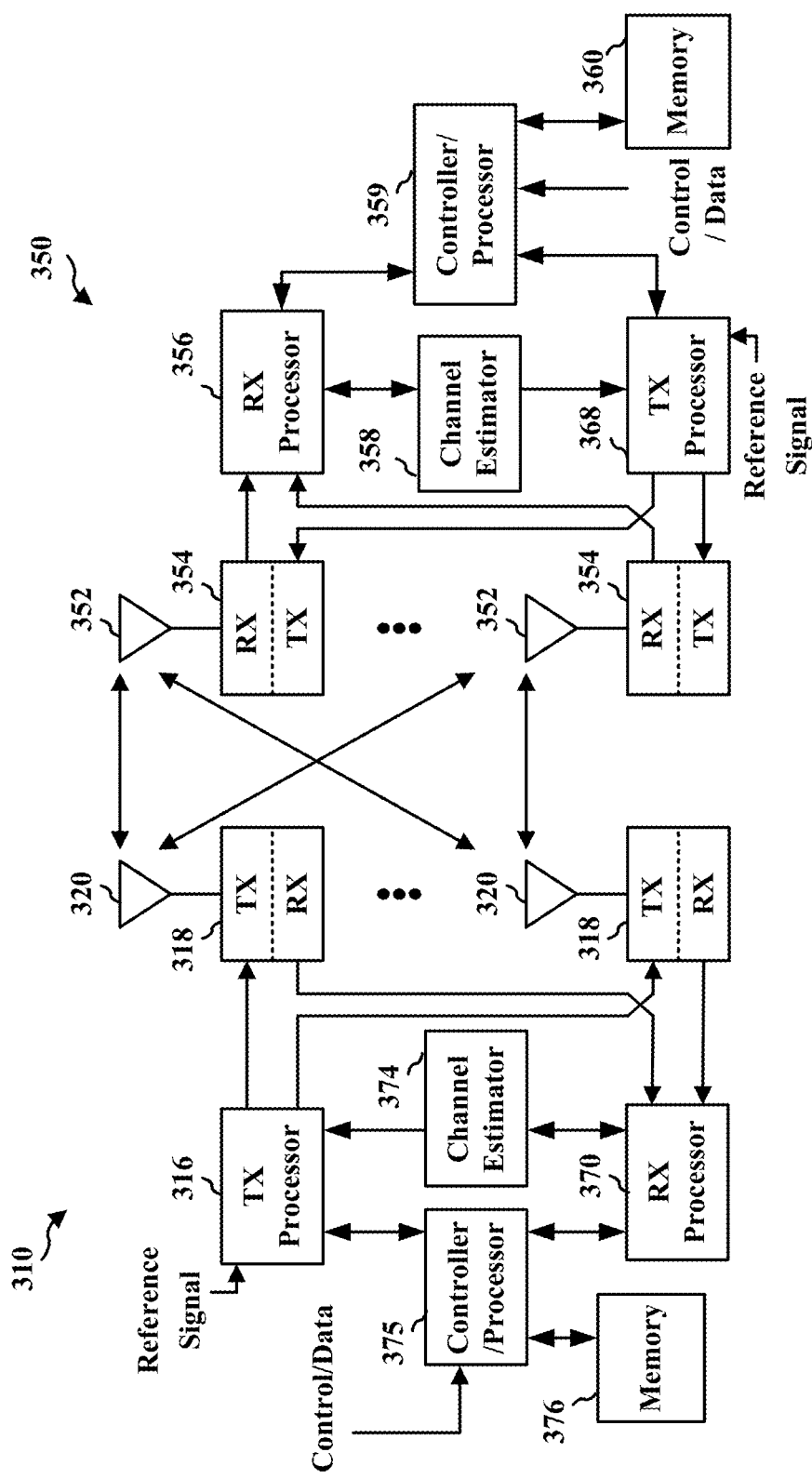
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with IM on RS component 198 of FIG. 1. At least one of the TX processor 316, the RX processor 370, and the controller/processor 375 may be configured to perform aspects in connection with IM on RS component 199 of FIG. 1.

The reduced capability NR device is an often studied item. In particular, UE bandwidth consumption reduction and UE power savings may be desired. Reducing the available bandwidth may reduce the available resources. Therefore, techniques for conserving the resources by reusing resources as much as possible for different purposes may be desirable.

DL control may be carried semi-statically using RRC signaling or dynamically using a MAC control element (MAC-CE) or DCI. DCI may utilize configured CORESET resources having an associated search space (SS). These CORESET resources may or may not be utilized, which is not resource friendly. The UE may consume power while blind decoding PDCCH in the SS. The UE may wait until SS periodicity before monitoring DCI. Further, DCI via a PDCCH may be resource and/or power inefficient to send a small number of DL information control bits. Further, UL control may be carried on a PUSCH or a PUCCH. To reduce PUCCH preconfigured resources, UCI may be carried using other existing signals. Aspects relate to techniques for sending a small number of DL or UL control bits without consuming additional resources and/or power by reusing already existing resources.

IM may refer to modulation techniques that rely on the activation states of some resources/building blocks for information embedding. The resources/building blocks can be either physical, e.g., antenna, subcarrier, time slot, and frequency carrier, or virtual, e.g., virtual parallel channels, signal constellation, space-time matrix, and antenna activation order. With IM, the information bits may be split into two parts. Part 1 information bits (e.g., the first bits herein) may be conveyed implicitly by the index usage or activation patterns in the case of source-based IM (SBIM), subcarriers (e.g., frequency domain (FD) IM "FD-IM"), antennas (e.g., spatial domain (SD) IM "SD-IM" also known as spatial modulation "SM"), or time slots (e.g., time domain (TD) IM "TD-IM"), or in the case of media-based modulation (MBM), channel states (e.g., channel domain (CD) IM "CD-IM"). Part 2 information bits (e.g., the second bits herein) may be modulated using either conventional amplitude/phase modulation (APM) schemes or any other means of orthogonality. With IM, a subset of resources, e.g., subcarriers, antennas, time slots, or channel states, are used for a transmission. The others are kept unused by the associated transmission. Thus, additional information bits may be conveyed implicitly by the index usage or activation patterns.

In one aspect, on/off keying is utilized with IM. The RS utilized may be CSI-RS, although other RSs may be used as well. To transmit the first bits, a subset of CSI-RS resources may be activated based on the first bits and used for CSI-RS transmission. The other configured resources may not be activated, and may be kept unused by the associated transmission. These activated CSI-RS resources may be a combination of one or more of the following: beams (transmission configuration indication (TCI) states) (i.e., SD-IM also known as SM), subcarriers/RBs (i.e., FD-IM), or time symbols (e.g., if repetition is enabled) (i.e., TD-IM). To transmit the second bits, within the activated resources, additional information bits (e.g., the second bits) may be sent that can be based on a CSI-RS sequence (i.e., based on the initialization equation used for the CSI-RS sequence generator), a CSI-RS port, a CSI-RS density in FD, a TD or FD allocation within an RB, a bandwidth (BW), or a resource mapping (i.e., 2 symbols in 1 or 2 slot).

Figure 4:
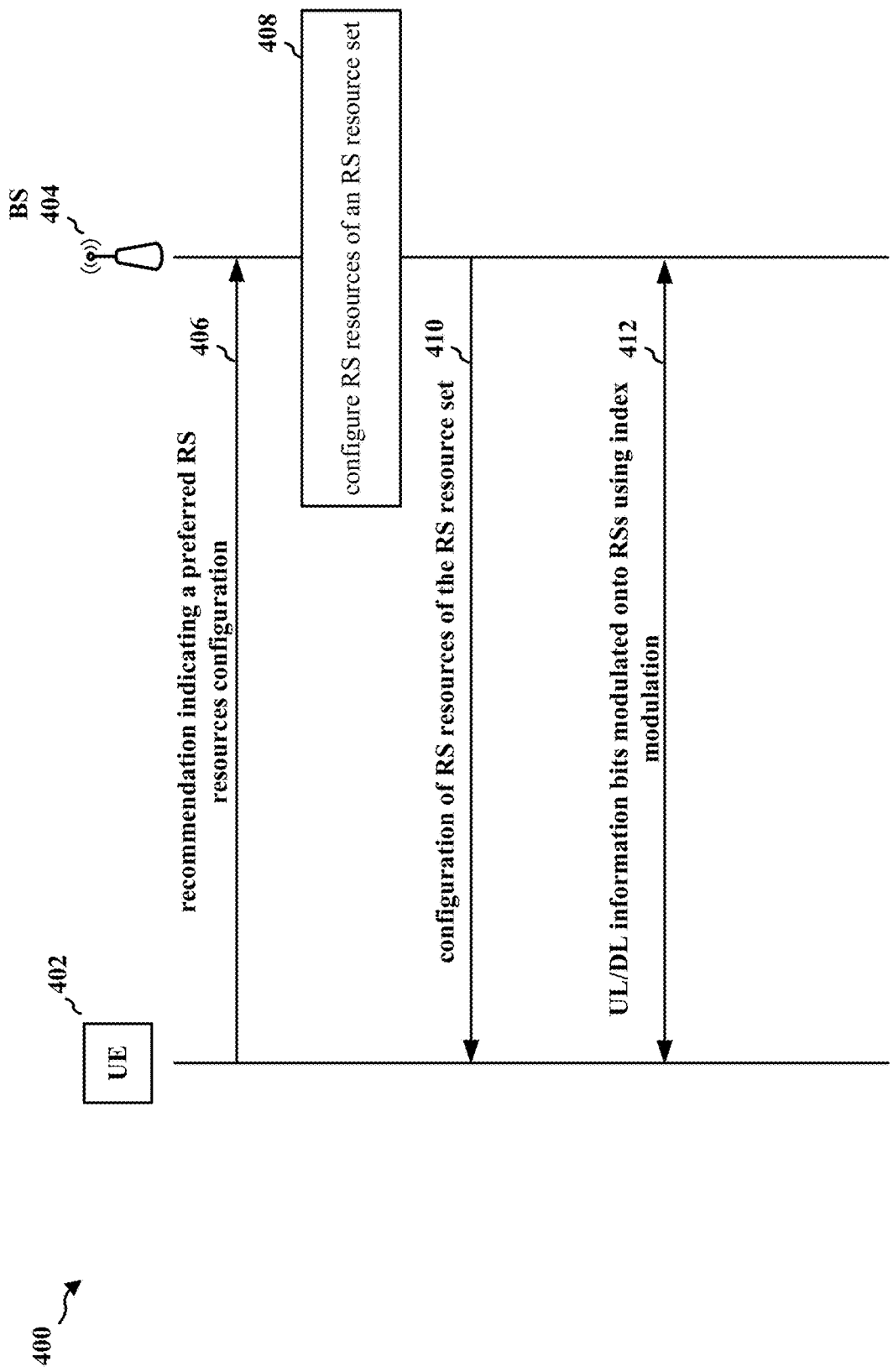
FIG. 4 is a call-flow diagram illustrating transmission of control information modulated onto RSs using IM.

FIG. 4 is a call-flow diagram 400 illustrating transmission of control information modulated onto RSs using IM. At 406, in some aspects, the UE 402 may transmit to the base station (BS) 404, and the BS 404 may receive from the UE 402, a configuration recommendation indicating an RS resources configuration. The RS resources configuration may include a bit split within a plurality of DL or UL information bits of at least one of one or more first bits or one or more second bits. At 408, the BS 404 may configure one or more RS resources of an RS resource set. The one or more RS resources may be associated with an index modulation technique including a plurality of DL or UL information bits.

At 410, the BS 404 may transmit to the UE 402, and the UE 402 may receive from the BS 404, a configuration of the one or more RS resources of the RS resource set. At 412, the UE 402 may transmit to the BS 404 or receive from the BS 404, and the BS 404 may transmit to the UE 402 or receive from the UE 402, the plurality of DL or UL information bits. The plurality of DL or UL information bits may include at least one of one or more first bits or one or more second bits. The plurality of DL or UL information bits may include DL or UL control information. In particular, at least one of the one or more RS resources may be selected based on at least one of the one or more first bits or the one or more second bits. Selecting the at least one of the one or more RS resources may further include transmitting to the BS 404 or receiving from the BS 404 by the UE 402, or transmitting to the UE 402 or receiving from the UE 402 by the BS 404, one or more RSs based on the selected at least one of the one or more RS resources.

FIG. 5 is a diagram 500 illustrating an example configuration for transmission of information with IM or RS. Some or all of the information in the configuration may be negotiated between the UE and the base station/network, and may be carried in one or more RSs. The configuration may indicate the RS that is configured, which may be one of CSI-RSs (for DL), DMRSs (for DL), SRSs (for UL), or a PRACH (for UL). The configuration may indicate either use or nonuse of IM in the configured RS resources. In case IM is not used, the RSs concerned may be regular RSs. In case IM is used, a bit split between first bits and second bits may be indicated. For example, it may be indicated that the first bits include a first quantity (m) bits and the second bits include a second quantity (n) bits.

The modulation of the first bits may be indicated in the configuration. The one or more first bits may be associated with at least one of one or more UL or DL beams, one or more subcarriers, one or more frequency locations, or one or more time symbols. In particular, selecting the at least one of the one or more RS resources may further include activating or deactivating the at least one of the one or more RS resources based on the one or more first bits. Accordingly, the activated or deactivated at least one of the one or more RS resources is at least one of one or more UL or DL beams, one or more subcarriers, one or more frequency locations, or one or more time symbols.

The modulation of the second bits may be indicated in the configuration. The one or more second bits may be associated with at least one of an RS sequence, an RS port, an RS density or comb structure, a TD or an FD allocation, or a resource mapping. In particular, selecting the at least one of the one or more RS resources further includes selecting a configuration of the at least one of the one or more RS resources based on the one or more second bits. Accordingly, the selected configuration of the at least one of the one or more RS resources may be at least one of an RS sequence, an RS port, an RS density or comb structure, a TD or an FD allocation, or a resource mapping.

The configuration may indicate the content of the first bits. The first bits may include control information of predefined types, or may include types of the control information included in the DL or UL information bits. The configuration may also indicate the content of the second bits. The second bits may include the control information. In some aspects where the control information is already carried in the first bits, the second bits may not be utilized.

Accordingly, in one aspect, the plurality of DL or UL information bits may include both the one or more first bits and the one or more second bits, and both the one or more first bits and the one or more second bits may include control information of one or more predefined control information types (e.g., a TCI state and/or a BWP index). In another aspect, the plurality of DL or UL information bits may include both the one or more first bits and the one or more second bits. The one or more first bits may include one or more control information types associated with control information included in the plurality of DL or UL information bits, and the one or more second bits may include the control information.

The configuration may also indicate the periodicity of the RS. The RS may be transmitted or received either periodically or aperiodically.

Figure 6:
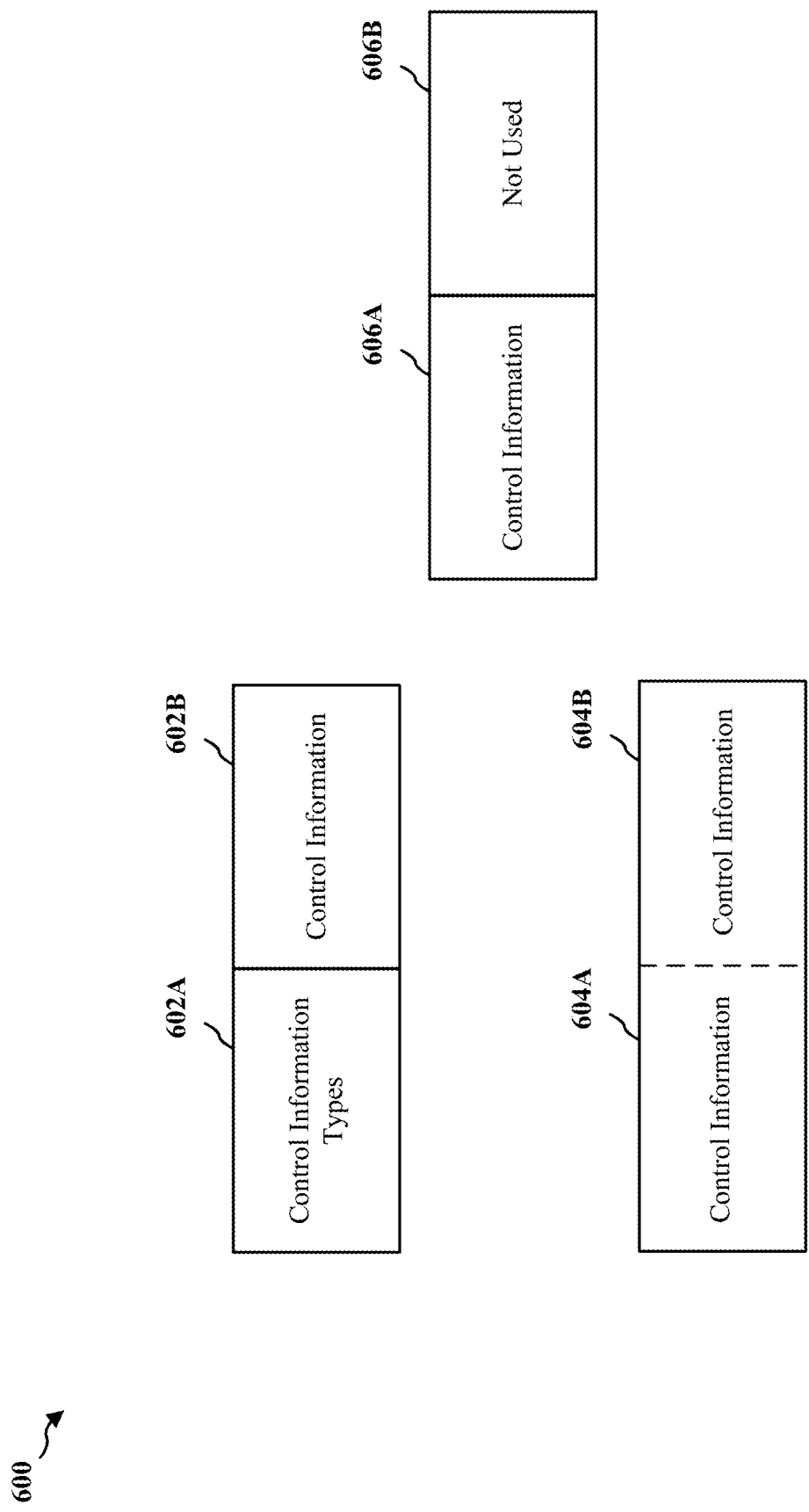
FIG. 6 is a diagram illustrating example contents of the first bits and the second bits.

FIG. 6 is a diagram 600 illustrating example contents of the first bits and the second bits. In one aspect, the one or more first bits 602A may include one or more control information types associated with control information included in the plurality of DL or UL information bits, and the one or more second bits 602B may include the control information. In another aspect, both the one or more first bits 604A and the one or more second bits 604B may include control information of one or more predefined control information types. In yet another aspect, the one or more first bits 606A may include control information of one or more predefined control information types, and the second bits 606B may not be utilized to carry control information.

FIG. 7 is a diagram 700 illustrating SD-IM and RS sequence-based modulation. In this example, the first bits to be transmitted include the sequence 1000101101000111, and the second bits to be transmitted include the sequence 0110001100101101. A CSI-RS resource set may be configured with L beams (i.e., L CSI-RS resources). For the first bits, the L beams allow for the conveying of L first bits using simple on/off keying. As the bits are equiprobable, that is, on average half of the information bits (i.e., L/2) are '1,' L/2 beams are activated. For the second bits, each activated beam may use one out of S possible orthogonal sequences. Therefore, the number of bits that can be carried in total is $$L + \frac{L}{2}\log_2 S$$

bits. In this example, L=16, S=4. Accordingly, 32 bits in total can be carried.

Figure 8:
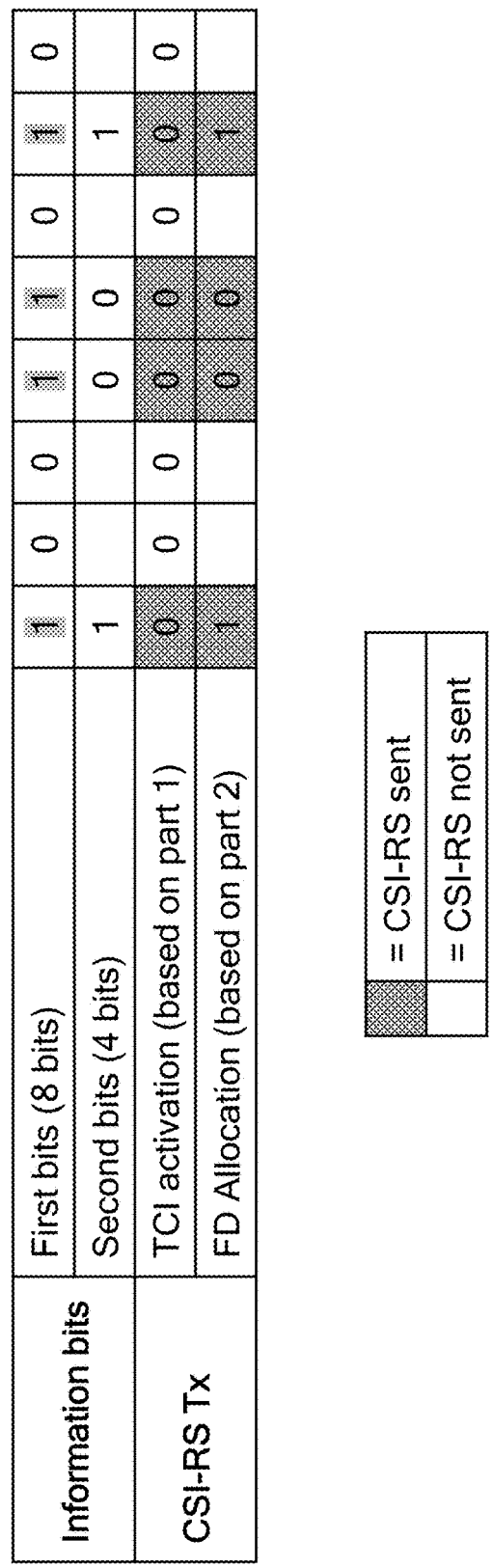
FIG. 8 is a diagram illustrating TD-IM and FD location within RB-based modulation.

FIG. 8 is a diagram 800 illustrating TD-IM and FD location within RB-based modulation. In this example, the first bits to be transmitted include the sequence 10011010, and the second bits to be transmitted include the sequence 1001. A CSI-RS resource set may be configured with L beams with repetition (i.e., L CSI-RS resources). For the first bits, the L time slots allow for the conveying of L first bits using simple on/off keying. As the bits are equiprobable, that is, on average half of the information bits (i.e., L/2) are '1,' L/2 time slots are activated. For the second bits, each activated time slot may use one out of S possible FD locations within the RB. Therefore, the number of bits that can be carried in total is $$L + \frac{L}{2}\log_2 S$$

bits. In this example, L=8, S=2. Accordingly, 12 bits in total can be carried.

Figure 9:
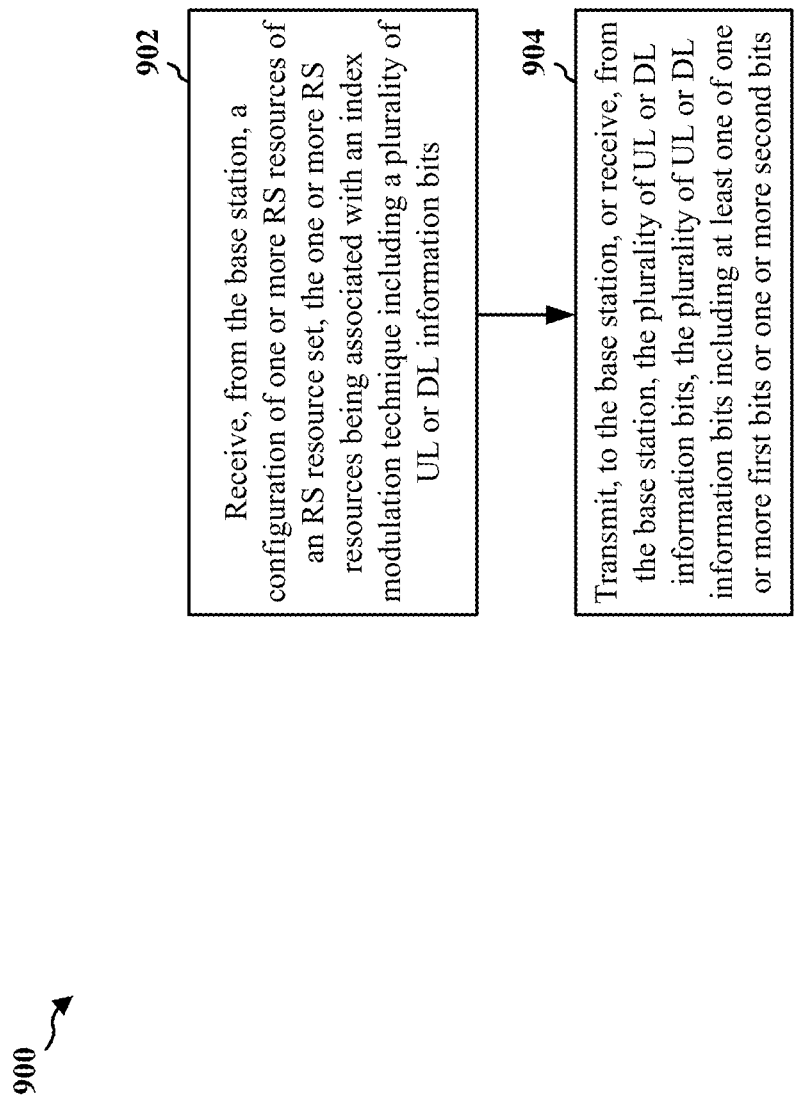
FIG. 9 is a flowchart of a method of wireless communication.

FIG. 9 is a flowchart 900 of a method of wireless communication. The method may be performed by a UE (e.g., the UE 104/350/402; the apparatus 1302). At 902, the UE may receive, from the base station, a configuration of one or more RS resources of an RS resource set. For example, 902 may be performed by reception component 1330 and IM on RS component 1340. The one or more RS resources may be associated with an index modulation technique including a plurality of UL or DL information bits. Referring to FIG. 4, at 410, the UE 402 may receive, from the base station 404, a configuration of one or more RS resources of an RS resource set.

At 904, the UE may transmit, to the base station, or receive, from the base station, the plurality of UL or DL information bits. For example, 904 may be performed by reception component 1330, IM on RS component 1340, and transmission component 1334. The plurality of UL or DL information bits may include at least one of one or more first bits or one or more second bits. At least one of the one or more RS resources may be selected based on at least one of the one or more first bits or the one or more second bits. Referring to FIG. 4, at 412, the UE 402 may transmit, to the base station 404, or receive, from the base station 404, the plurality of UL or DL information bits.

Figure 10:
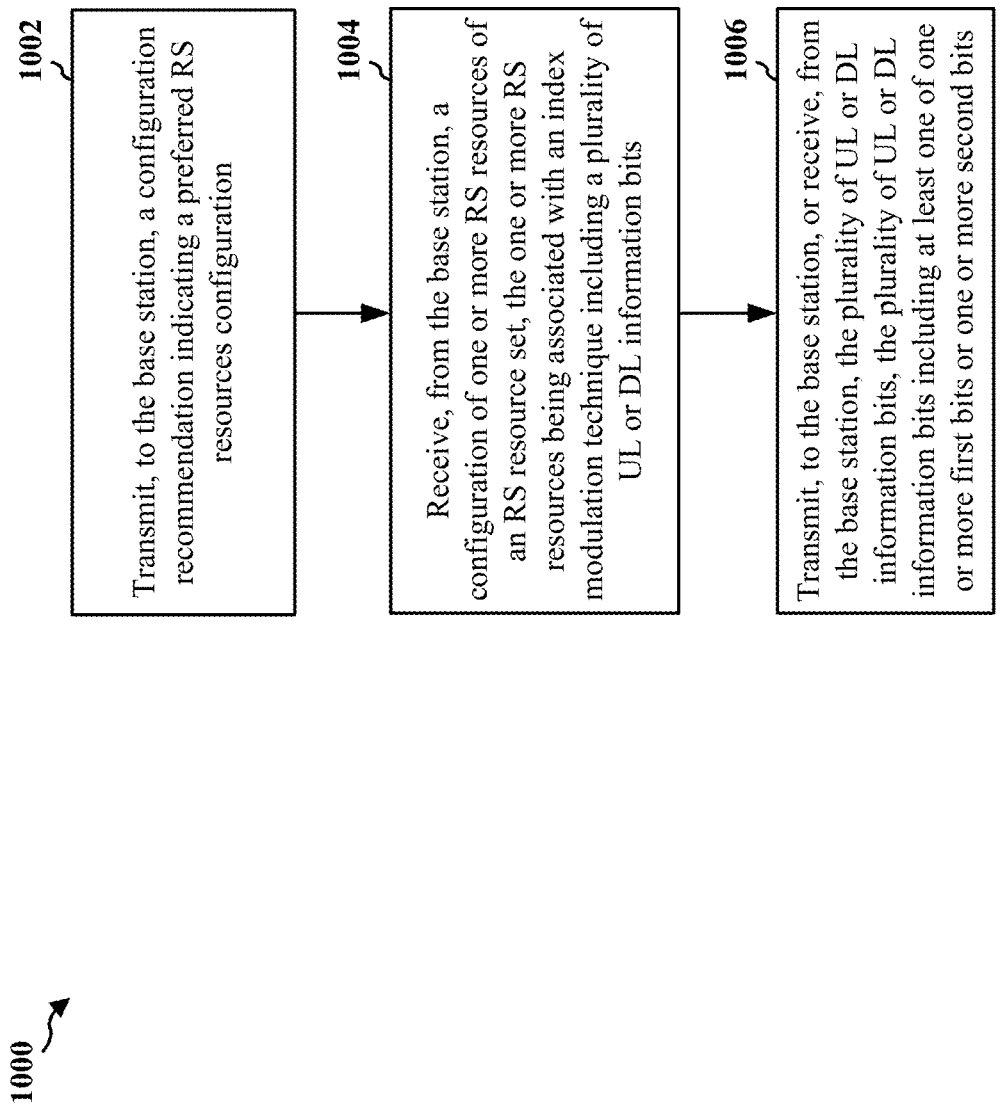
FIG. 10 is a flowchart of a method of wireless communication.

FIG. 10 is a flowchart 1000 of a method of wireless communication. The method may be performed by a UE (e.g., the UE 104/350/402; the apparatus 1302).

At 1004, the UE may receive, from the base station, a configuration of one or more RS resources of an RS resource set. For example, 1004 may be performed by reception component 1330 and IM on RS component 1340. The one or more RS resources may be associated with an index modulation technique including a plurality of UL or DL information bits. Referring to FIG. 4, at 410, the UE 402 may receive, from the base station 404, a configuration of one or more RS resources of an RS resource set.

At 1006, the UE may transmit, to the base station, or receive, from the base station, the plurality of UL or DL information bits. For example, 1006 may be performed by reception component 1330, IM on RS component 1340, and transmission component 1334. The plurality of UL or DL information bits may include at least one of one or more first bits or one or more second bits. At least one of the one or more RS resources may be selected based on at least one of the one or more first bits or the one or more second bits. Referring to FIG. 4, at 412, the UE 402 may transmit, to the base station 404, or receive, from the base station 404, the plurality of UL or DL information bits.

In one configuration, the one or more RS resources may be associated with one or more RSs including at least one of CSI-RSs, DMRSs, SRSs, or a PRACH.

In one configuration, the one or more first bits may be associated with at least one of one or more UL or DL beams, one or more subcarriers, one or more frequency locations, or one or more time symbols.

In one configuration, the one or more second bits may be associated with at least one of an RS sequence, an RS port, an RS density or comb structure, a TD or an FD allocation, or a resource mapping.

In one configuration, the at least one processor may be configured to activate or deactivate the at least one of the one or more RS resources based on the one or more first bits.

In one configuration, the activated or deactivated at least one of the one or more RS resources may be at least one of one or more UL or DL beams, one or more subcarriers, one or more frequency locations, or one or more time symbols.

In one configuration, the UE may select a configuration of the at least one of the one or more RS resources based on the one or more second bits.

In one configuration, the selected configuration of the at least one of the one or more RS resources may be at least one of an RS sequence, an RS port, an RS density or comb structure, a TD or an FD allocation, or a resource mapping.

In one configuration, the UE may transmit, to the base station, or receive, from the base station, one or more RSs based on the selected at least one of the one or more RS resources. The one or more RSs may be transmitted or received periodically or aperiodically.

In one configuration, at 1002, the UE may transmit, to a base station, a configuration recommendation indicating an RS resources configuration. For example, 1002 may be performed by transmission component 1334 and IM on RS component 1340. The RS resources configuration may include a bit split within a plurality of DL or UL information bits of at least one of one or more first bits or one or more second bits. Referring to FIG. 4, at 406, the UE 402 may transmit, to a base station 404, a configuration recommendation indicating an RS resources configuration.

In one configuration, the configuration received from the base station may include a bit split within the plurality of UL or DL information bits of the at least one of the one or more first bits or the one or more second bits.

In one configuration, the plurality of UL or DL information bits may include both the one or more first bits and the one or more second bits. Both the one or more first bits and the one or more second bits may include control information of one or more predefined control information types.

In one configuration, the plurality of UL or DL information bits may include both the one or more first bits and the one or more second bits. The one or more first bits may include one or more control information types associated with control information included in the plurality of UL or DL information bits. The one or more second bits may include the control information.

In one configuration, the one or more RS resources may include an indication of use or nonuse of the index modulation technique.

Figure 11:
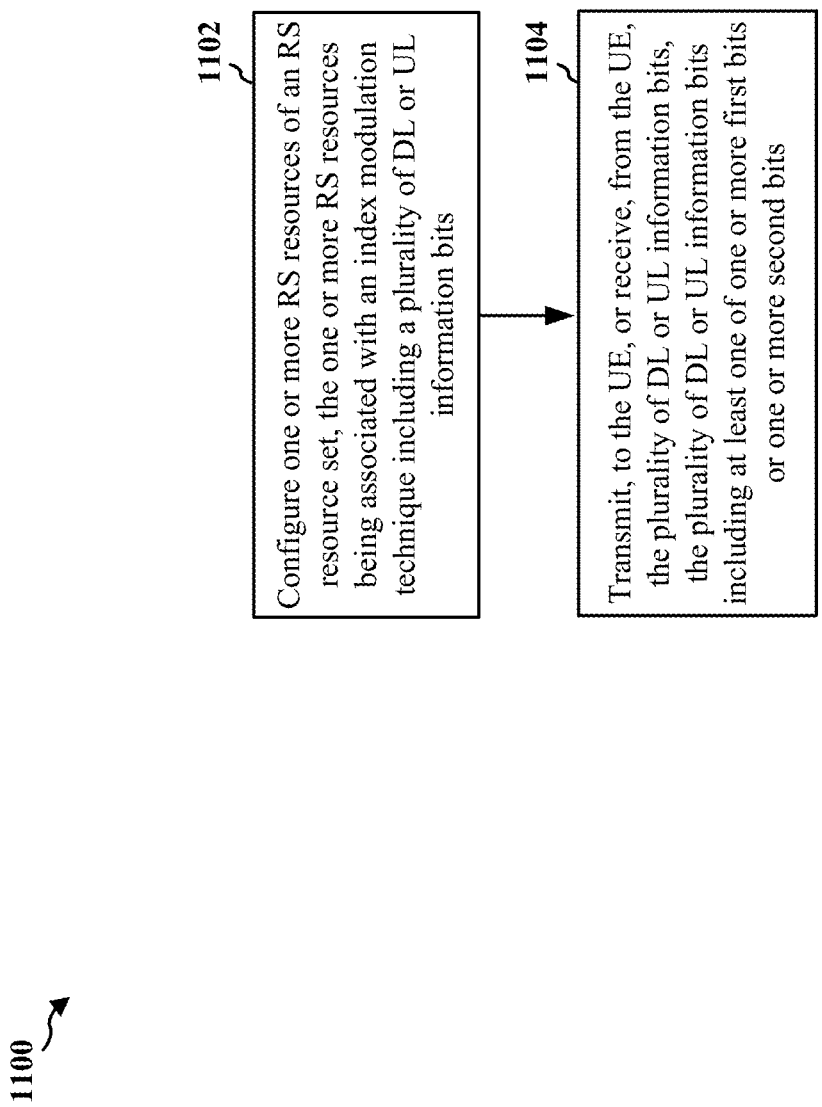
FIG. 11 is a flowchart of a method of wireless communication.

FIG. 11 is a flowchart 1100 of a method of wireless communication. The method may be performed by a base station (e.g., the base station 102/180/310/404; the apparatus 1402). At 1102, the base station may configure one or more RS resources of an RS resource set. For example, 1102 may be performed by IM on RS component 1440. The one or more RS resources may be associated with an index modulation technique including a plurality of DL or UL information bits. Referring to FIG. 4, at 408, the base station 404 may configure one or more RS resources of an RS resource set.

At 1104, the base station may transmit, to the UE, or receive, from the UE, the plurality of DL or UL information bits. For example, 1104 may be performed by reception component 1430, IM on RS component 1440, and transmission component 1434. The plurality of DL or UL information bits may include at least one of one or more first bits or one or more second bits. At least one of the one or more RS resources may be selected based on at least one of the one or more first bits or the one or more second bits. Referring to FIG. 4, at 412, the base station 404 may transmit, to the UE 402, or receive, from the UE 402, the plurality of DL or UL information bits.

Figure 12:
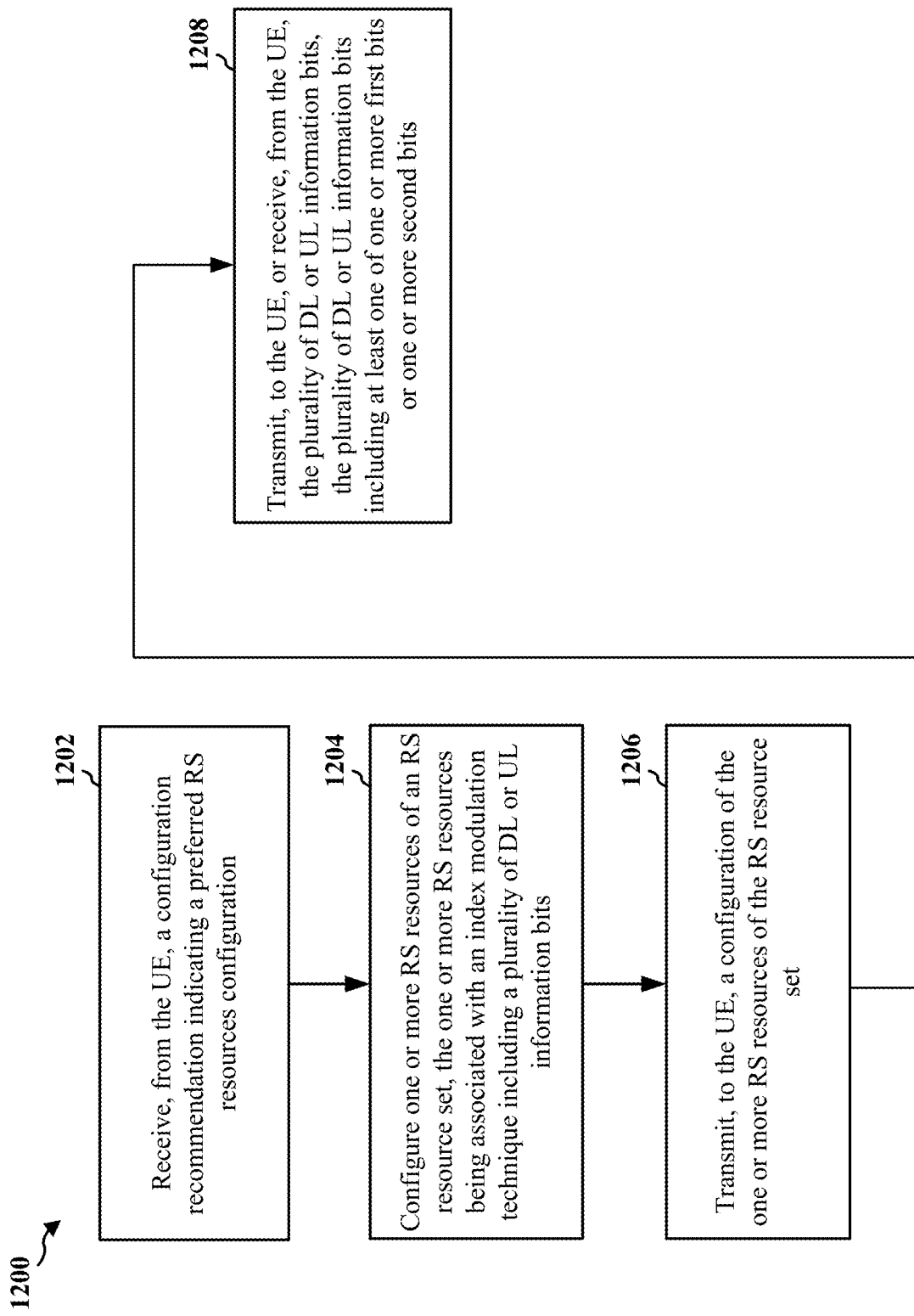
FIG. 12 is a flowchart of a method of wireless communication.

FIG. 12 is a flowchart 1200 of a method of wireless communication. The method may be performed by a base station (e.g., the base station 102/180/310/404; the apparatus 1402). At 1204, the base station may configure one or more RS resources of an RS resource set. For example, 1204 may be performed by IM on RS component 1440. The one or more RS resources may be associated with an index modulation technique including a plurality of DL or UL information bits. Referring to FIG. 4, at 408, the base station 404 may configure one or more RS resources of an RS resource set.

At 1208, the base station may transmit, to the UE, or receive, from the UE, the plurality of DL or UL information bits. For example, 1208 may be performed by reception component 1430, IM on RS component 1440, and transmission component 1434. The plurality of DL or UL information bits may include at least one of one or more first bits or one or more second bits. At least one of the one or more RS resources may be selected based on at least one of the one or more first bits or the one or more second bits. Referring to FIG. 4, at 412, the base station 404 may transmit, to the UE 402, or receive, from the UE 402, the plurality of DL or UL information bits.

In one configuration, the one or more RS resources may be associated with one or more RSs including at least one of CSI-RSs, DMRSs, SRSs, or a PRACH.

In one configuration, the one or more first bits may be associated with at least one of one or more DL or UL beams, one or more subcarriers, one or more frequency locations, or one or more time symbols.

In one configuration, the one or more second bits may be associated with at least one of an RS sequence, an RS port, an RS density or comb structure, a TD or an FD allocation, or a resource mapping.

In one configuration, the base station may activate or deactivate the at least one of the one or more RS resources based on the one or more first bits.

In one configuration, the activated or deactivated at least one of the one or more RS resources may be at least one of one or more DL or UL beams, one or more subcarriers, one or more frequency locations, or one or more time symbols.

In one configuration, the base station may select a configuration of the at least one of the one or more RS resources based on the one or more second bits.

In one configuration, the selected configuration of the at least one of the one or more RS resources may be at least one of an RS sequence, an RS port, an RS density or comb structure, a TD or an FD allocation, or a resource mapping.

In one configuration, the base station may transmit, to the UE, or receive, from the UE, one or more RSs based on the selected at least one of the one or more RS resources. The one or more RSs may be transmitted or received periodically or aperiodically.

In one configuration, at 1206, to configure the one or more RS resources of the RS resource set, the base station may transmit, to the UE, a configuration of the one or more RS resources of the RS resource set. For example, 1206 may be performed by transmission component 1434. Referring to FIG. 4, at 410, the base station 404 may transmit, to the UE 402, a configuration of the one or more RS resources of the RS resource set.

In one configuration, the configuration transmitted to the UE may include a bit split within the plurality of DL or UL information bits of the at least one of the one or more first bits or the one or more second bits.

In one configuration, at 1202, the base station may receive, from a UE, a configuration recommendation indicating an RS resources configuration. For example, 1202 may be performed by reception component 1430 and IM on RS component 1440. Referring to FIG. 4, at 406, the base station 404 may receive, from a UE 402, a configuration recommendation indicating an RS resources configuration.

In one configuration, the plurality of DL or UL information bits may include both the one or more first bits and the one or more second bits. Both the one or more first bits and the one or more second bits may include control information of one or more predefined control information types.

In one configuration, the plurality of DL or UL information bits may include both the one or more first bits and the one or more second bits. The one or more first bits may include one or more control information types associated with control information included in the plurality of DL or UL information bits. The one or more second bits may include the control information.

In one configuration, the one or more RS resources may include an indication of use or nonuse of the index modulation technique.

Figure 13:
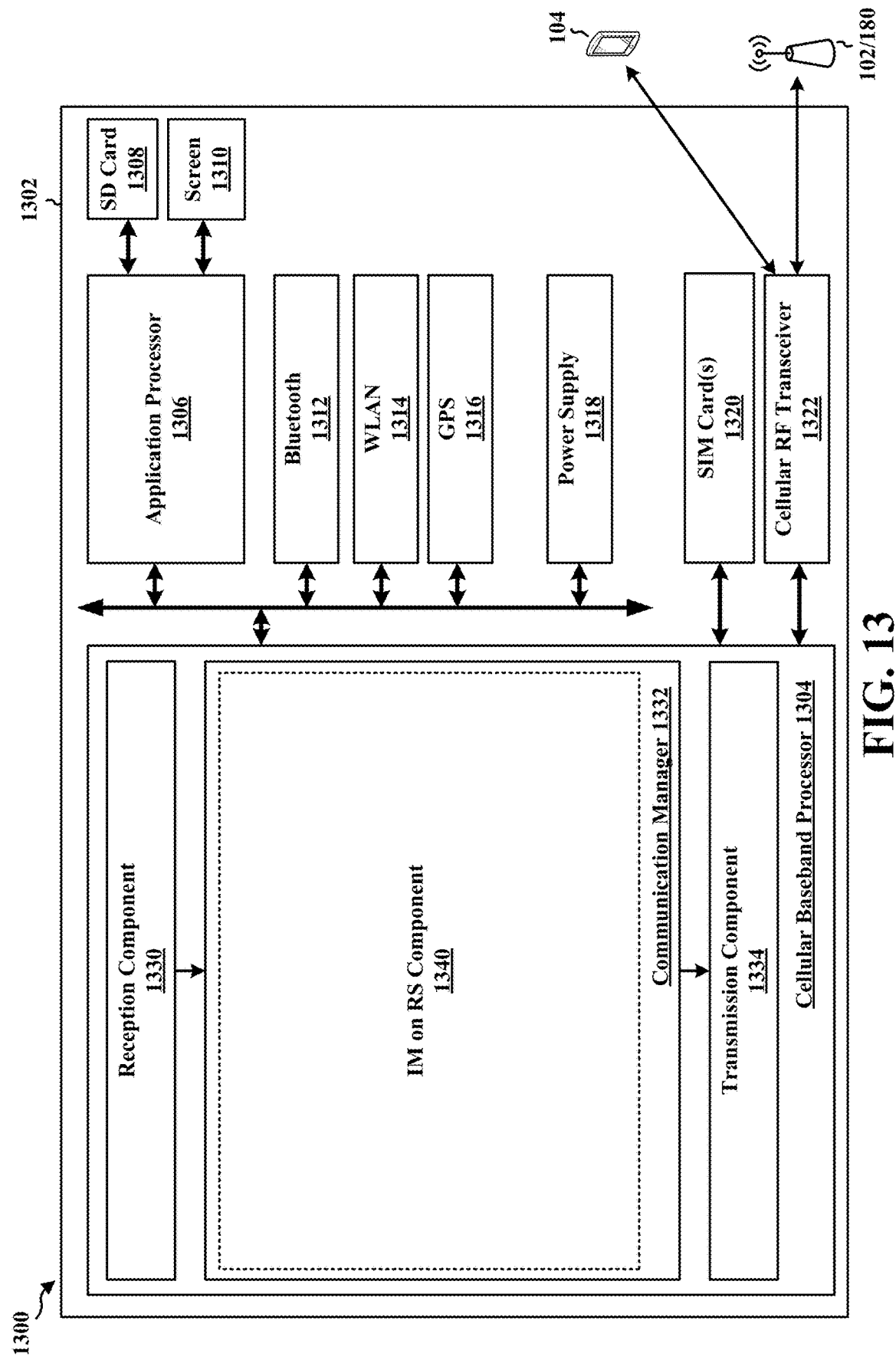
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes an IM on RS component 1340 that is configured to, together with reception component 1330, transmit, to the base station, a configuration recommendation indicating a preferred RS resources configuration including a bit split within the plurality of UL or DL information bits of the at least one of the one or more first bits or the one or more second bits, e.g., as described in connection with 1002 in FIG. 10. The IM on RS component 1340 is further configured to, together with transmission component 1334 or reception component 1330, receive, from a base station, a configuration of one or more RS resources of an RS resource set, e.g., as described in connection with 902 in FIG. 9 and 1004 in FIG. 10. The one or more RS resources may be associated with an index modulation technique including a plurality of UL or DL information bits. The IM on RS component 1340 is further configured to, together with transmission component 1334 or reception component 1330, transmit, to the base station, or receive, from the base station, the plurality of UL or DL information bits, e.g., as described in connection with 904 in FIGS. 9 and 1006 in FIG. 10. The plurality of UL or DL information bits may include at least one of one or more first bits or one or more second bits. At least one of the one or more RS resources may be selected based on at least one of the one or more first bits or the one or more second bits.

The apparatus may include additional components that perform each of the blocks of the algorithm in the flowcharts of FIGS. 4, 9, 10. As such, each block in the flowcharts of FIGS. 4, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving, from a base station, a configuration of one or more RS resources of an RS resource set. The one or more RS resources may be associated with an index modulation technique including a plurality of UL or DL information bits. The apparatus 1302, and in particular the cellular baseband processor 1304, includes means for transmitting, to the base station, or receiving, from the base station, the plurality of UL or DL information bits. The plurality of UL or DL information bits may include at least one of one or more first bits or one or more second bits. At least one of the one or more RS resources may be selected based on at least one of the one or more first bits or the one or more second bits.

In one configuration, the one or more RS resources may be associated with one or more RSs including at least one of CSI-RSs, DMRSs, SRSs, or a PRACH. In one configuration, the one or more first bits may be associated with at least one of one or more UL or DL beams, one or more subcarriers, one or more frequency locations, or one or more time symbols. In one configuration, the one or more second bits may be associated with at least one of an RS sequence, an RS port, an RS density or comb structure, a TD or an FD allocation, or a resource mapping. In one configuration, the at least one processor may be configured to activate or deactivate the at least one of the one or more RS resources based on the one or more first bits. In one configuration, the activated or deactivated at least one of the one or more RS resources may be at least one of one or more UL or DL beams, one or more subcarriers, one or more frequency locations, or one or more time symbols. In one configuration, the apparatus 1302, and in particular the cellular baseband processor 1304, includes means for selecting a configuration of the at least one of the one or more RS resources based on the one or more second bits. In one configuration, the selected configuration of the at least one of the one or more RS resources may be at least one of an RS sequence, an RS port, an RS density or comb structure, a TD or an FD allocation, or a resource mapping. In one configuration, the apparatus 1302, and in particular the cellular baseband processor 1304, includes means for transmitting, to the base station, or receive, from the base station, one or more RSs based on the selected at least one of the one or more RS resources. The one or more RSs may be transmitted or received periodically or aperiodically. In one configuration, the apparatus 1302, and in particular the cellular baseband processor 1304, includes means for transmitting, to a base station, a configuration recommendation indicating an RS resources configuration. The RS resources configuration may include a bit split within a plurality of DL or UL information bits of at least one of one or more first bits or one or more second bits. In one configuration, the configuration received from the base station may include a bit split within the plurality of UL or DL information bits of the at least one of the one or more first bits or the one or more second bits. In one configuration, the plurality of UL or DL information bits may include both the one or more first bits and the one or more second bits. Both the one or more first bits and the one or more second bits may include control information of one or more predefined control information types. In one configuration, the plurality of UL or DL information bits may include both the one or more first bits and the one or more second bits. The one or more first bits may include one or more control information types associated with control information included in the plurality of UL or DL information bits. The one or more second bits may include the control information. In one configuration, the one or more RS resources may include an indication of use or nonuse of the index modulation technique.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
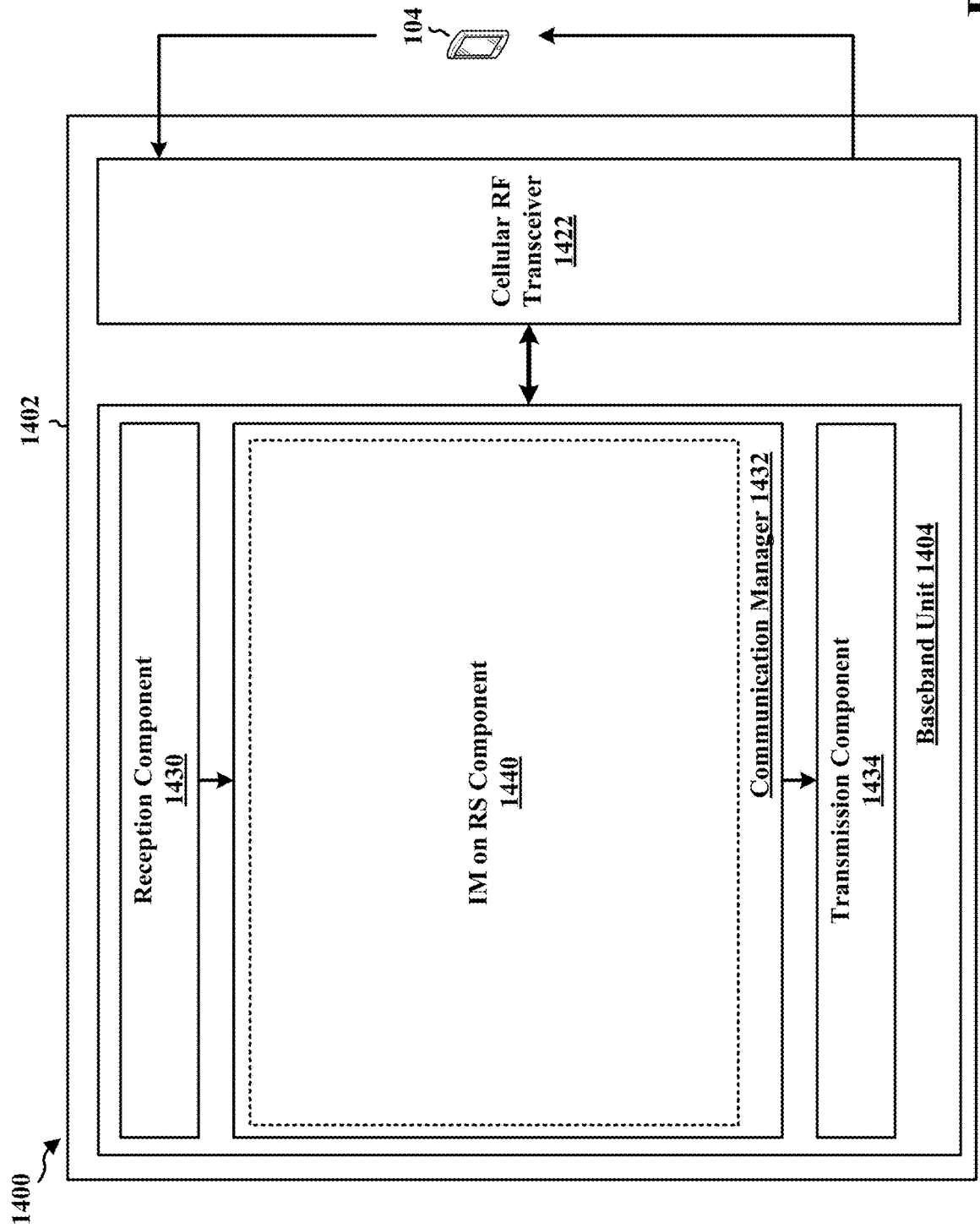
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes an IM on RS component 1440 that is configured to, together with transmission component 1434 or reception component 1430, receive, from the UE, a configuration recommendation indicating an RS resources configuration including a bit split within the plurality of DL or UL information bits of the at least one of the one or more first bits or the one or more second bits, e.g., as described in connection with 1202 in FIG. 12. The IM on RS component 1440 is further configured to configure one or more RS resources of an RS resource set, e.g., as described in connection with 1102 in FIG. 11 and 1204 in FIG. 12. The one or more RS resources may be associated with an index modulation technique including a plurality of DL or UL information bits. The IM on RS component 1440 is further configured to, together with transmission component 1434 or reception component 1430, transmit, to a UE, or receive, from the UE, the plurality of DL or UL information bits, e.g., as described in connection with 1206 in FIG. 12. The plurality of UL or DL information bits may include at least one of one or more first bits or one or more second bits. The IM on RS component 1440 is further configured to, together with transmission component 1434 or reception component 1430, transmit, to a UE, or receive, from the UE, the plurality of DL or UL information bits, e.g., as described in connection with 1104 in FIG. 11 and 1208 in FIG. 12. The plurality of DL or UL information bits may include at least one of one or more first bits or one or more second bits. At least one of the one or more RS resources may be selected based on at least one of the one or more first bits or the one or more second bits.

The apparatus may include additional components that perform each of the blocks of the algorithm in the flowcharts of FIGS. 4, 11, and 12. As such, each block in the flowcharts of FIGS. 4, 11, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for configuring one or more RS resources of an RS resource set. The one or more RS resources may be associated with an index modulation technique including a plurality of DL or UL information bits. The apparatus 1402, and in particular the baseband unit 1404, includes means for transmitting, to a UE, or receiving, from the UE, the plurality of DL or UL information bits. The plurality of DL or UL information bits may include at least one of one or more first bits or one or more second bits. At least one of the one or more RS resources may be selected based on at least one of the one or more first bits or the one or more second bits.

In one configuration, the one or more RS resources may be associated with one or more RSs including at least one of CSI-RSs, DMRSs, SRSs, or a PRACH. In one configuration, the one or more first bits may be associated with at least one of one or more DL or UL beams, one or more subcarriers, one or more frequency locations, or one or more time symbols. In one configuration, the one or more second bits may be associated with at least one of an RS sequence, an RS port, an RS density or comb structure, a TD or an FD allocation, or a resource mapping. In one configuration, the apparatus 1402, and in particular the baseband unit 1404, includes means activating or deactivating the at least one of the one or more RS resources based on the one or more first bits. In one configuration, the activated or deactivated at least one of the one or more RS resources may be at least one of one or more DL or UL beams, one or more subcarriers, one or more frequency locations, or one or more time symbols. In one configuration, the apparatus 1402, and in particular the baseband unit 1404, includes means selecting a configuration of the at least one of the one or more RS resources based on the one or more second bits. In one configuration, the selected configuration of the at least one of the one or more RS resources may be at least one of an RS sequence, an RS port, an RS density or comb structure, a TD or an FD allocation, or a resource mapping. In one configuration, the apparatus 1402, and in particular the baseband unit 1404, includes means transmitting, to the UE, or receiving, from the UE, one or more RSs based on the selected at least one of the one or more RS resources. The one or more RSs may be transmitted or received periodically or aperiodically. In one configuration, to configure the one or more RS resources of the RS resource set, the apparatus 1402, and in particular the baseband unit 1404, includes means transmitting, to the UE, a configuration of the one or more RS resources of the RS resource set. The configuration transmitted to the UE may include a bit split within the plurality of DL or UL information bits of the at least one of the one or more first bits or the one or more second bits. In one configuration, the apparatus 1402, and in particular the baseband unit 1404, includes means for receiving, from a UE, a configuration recommendation indicating an RS resources configuration. In one configuration, the plurality of DL or UL information bits may include both the one or more first bits and the one or more second bits. Both the one or more first bits and the one or more second bits may include control information of one or more predefined control information types. In one configuration, the plurality of DL or UL information bits may include both the one or more first bits and the one or more second bits. The one or more first bits may include one or more control information types associated with control information included in the plurality of DL or UL information bits. The one or more second bits may include the control information. In one configuration, the one or more RS resources may include an indication of use or nonuse of the index modulation technique.

The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring again to FIGS. 4-14, a method and an apparatus for transmitting (control) information by modulating it onto RSs using the IM technique are disclosed. By reusing existing resources, consumption of additional resources may be avoided when a limited number of DL or UL control information bits are to be transmitted.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a base station, a configuration of one or more RS resources of an RS resource set, the one or more RS resources being associated with an index modulation technique including a plurality of UL or DL information bits; and transmit, to the base station, or receive, from the base station, the plurality of UL or DL information bits, the plurality of UL or DL information bits including at least one of one or more first bits or one or more second bits, at least one of the one or more RS resources being selected based on at least one of the one or more first bits or the one or more second bits.

Aspect 2 is the apparatus of aspect 1, where the one or more RS resources are associated with one or more RSs including at least one of CSI-RSs, DMRSs, SRSs, or a PRACH.

Aspect 3 is the apparatus of any of aspects 1 and 2, where the one or more first bits are associated with at least one of one or more UL or DL beams, one or more subcarriers, one or more frequency locations, or one or more time symbols.

Aspect 4 is the apparatus of any of aspects 1 to 3, where the one or more second bits are associated with at least one of an RS sequence, an RS port, an RS density or comb structure, a TD or an FD allocation, or a resource mapping.

Aspect 5 is the apparatus of any of aspects 1 to 4, where the at least one processor is further configured to: activate or deactivate the at least one of the one or more RS resources based on the one or more first bits.

Aspect 6 is the apparatus of Aspect 5, where the activated or deactivated at least one of the one or more RS resources is at least one of one or more UL or DL beams, one or more subcarriers, one or more frequency locations, or one or more time symbols.

Aspect 7 is the apparatus of any of aspects 1 to 6, where the at least one processor is further configured to: select a configuration of the at least one of the one or more RS resources based on the one or more second bits.

Aspect 8 is the apparatus of aspect 7, where the selected configuration of the at least one of the one or more RS resources is at least one of an RS sequence, an RS port, an RS density or comb structure, a TD or an FD allocation, or a resource mapping.

Aspect 9 is the apparatus of any of aspects 1 to 8, where the at least one processor is further configured to: transmit, to the base station, or receive, from the base station, one or more RSs based on the selected at least one of the one or more RS resources.

Aspect 10 is the apparatus of aspect 9, where the one or more RSs are transmitted or received periodically.

Aspect 11 is the apparatus of aspect 9, where the one or more RSs are transmitted or received aperiodically.

Aspect 12 is the apparatus of any of aspects 1 to 11, where the at least one processor is further configured to: transmit, to the base station, a configuration recommendation indicating an RS resources configuration including a bit split within the plurality of UL or DL information bits of the at least one of the one or more first bits or the one or more second bits.

Aspect 13 is the apparatus of any of aspects 1 to 12, where the configuration received from the base station includes a bit split within the plurality of UL or DL information bits of the at least one of the one or more first bits or the one or more second bits.

Aspect 14 is the apparatus of any of aspects 1 to 13, where the plurality of UL or DL information bits include both the one or more first bits and the one or more second bits, and both the one or more first bits and the one or more second bits include control information of one or more predefined control information types.

Aspect 15 is the apparatus of any of aspects 1 to 13, where the plurality of UL or DL information bits include both the one or more first bits and the one or more second bits, and the one or more first bits include one or more control information types associated with control information included in the plurality of UL or DL information bits, and the one or more second bits include the control information.

Aspect 16 is the apparatus of any of aspects 1 to 15, where the one or more RS resources include an indication of use or nonuse of the index modulation technique.

Aspect 17 is the apparatus of any of aspects 1 to 16, further including a transceiver coupled to the at least one processor.

Aspect 18 is an apparatus for wireless communication at a base station including at least one processor coupled to a memory and configured to configure one or more RS resources of an RS resource set, the one or more RS resources being associated with an index modulation technique including a plurality of DL or UL information bits; and transmit, to a UE, or receive, from the UE, the plurality of DL or UL information bits, the plurality of DL or UL information bits including at least one of one or more first bits or one or more second bits, at least one of the one or more RS resources being selected based on at least one of the one or more first bits or the one or more second bits.

Aspect 19 is the apparatus of aspect 18, where the one or more RS resources are associated with one or more RSs including at least one of CSI-RSs, DMRSs, SRSs, or a PRACH.

Aspect 20 is the apparatus of any of aspects 18 and 19, where the one or more first bits are associated with at least one of one or more DL or UL beams, one or more subcarriers, one or more frequency locations, or one or more time symbols.

Aspect 21 is the apparatus of any of aspects 18 to 20, where the one or more second bits are associated with at least one of an RS sequence, an RS port, an RS density or comb structure, a TD or an FD allocation, or a resource mapping.

Aspect 22 is the apparatus of any of aspects 18 to 21, where the at least one processor is further configured to: activate or deactivate the at least one of the one or more RS resources based on the one or more first bits.

Aspect 23 is the apparatus of aspect 22, where the activated or deactivated at least one of the one or more RS resources is at least one of one or more DL or UL beams, one or more subcarriers, one or more frequency locations, or one or more time symbols.

Aspect 24 is the apparatus of any of aspects 18 to 23, where the at least one processor is further configured to: select a configuration of the at least one of the one or more RS resources based on the one or more second bits.

Aspect 25 is the apparatus of aspect 24, where the selected configuration of the at least one of the one or more RS resources is at least one of an RS sequence, an RS port, an RS density or comb structure, a TD or an FD allocation, or a resource mapping.

Aspect 26 is the apparatus of any of aspects 18 to 25, where the at least one processor is further configured to: transmit, to the UE, or receive, from the UE, one or more RSs based on the selected at least one of the one or more RS resources.

Aspect 27 is the apparatus of aspect 26, where the one or more RSs are transmitted or received periodically.

Aspect 28 is the apparatus of aspect 26, where the one or more RSs are transmitted or received aperiodically.

Aspect 29 is the apparatus of any of aspects 18 to 28, where to configure the one or more RS resources of the RS resource set, the at least one processor is configured to: transmit, to the UE, a configuration of the one or more RS resources of the RS resource set.

Aspect 30 is the apparatus of aspect 29, where the configuration transmitted to the UE includes a bit split within the plurality of DL or UL information bits of the at least one of the one or more first bits or the one or more second bits.

Aspect 31 is the apparatus of any of aspects 18 to 30, where the at least one processor is further configured to: receive, from the UE, a configuration recommendation indicating an RS resources configuration including a bit split within the plurality of DL or UL information bits of the at least one of the one or more first bits or the one or more second bits.

Aspect 32 is the apparatus of any of aspects 18 to 31, where the plurality of DL or UL information bits include both the one or more first bits and the one or more second bits, and both the one or more first bits and the one or more second bits include control information of one or more predefined control information types.

Aspect 33 is the apparatus of any of aspects 18 to 31, where the plurality of DL or UL information bits include both the one or more first bits and the one or more second bits, and the one or more first bits include one or more control information types associated with control information included in the plurality of DL or UL information bits, and the one or more second bits include the control information.

Aspect 34 is the apparatus of any of aspects 18 to 33, where the one or more RS resources include an indication of use or nonuse of the index modulation technique.

Aspect 35 is the apparatus of any of aspects to 18 to 34, further including a transceiver coupled to the at least one processor.

Aspect 36 is a method of wireless communication for implementing any of aspects 1 to 35.

Aspect 37 is an apparatus for wireless communication including means for implementing any of aspects 1 to 35.

Aspect 38 is a computer-readable medium storing computer executable code, where the code when executed by a processor causes the processor to implement any of aspects 1 to 35.

What is claimed is:

1. An apparatus for wireless communication at a user equipment (UE), comprising:
  memory; and
  at least one processor coupled to the memory and configured to:
    receive, from a base station, a configuration of one or more reference signal (RS) resources of an RS resource set, the one or more RS resources being associated with an index modulation technique including a plurality of uplink (UL) or downlink (DL) information bits; and
    transmit, to the base station, or receive, from the base station, the plurality of UL or DL information bits, the plurality of UL or DL information bits including at least one of one or more first bits or one or more second bits,
    at least one of the one or more RS resources being selected based on at least one of the one or more first bits or the one or more second bits, wherein the configuration comprises a bit split within the plurality of UL or DL information bits of the at least one of the one or more first bits or the one or more second bits or wherein the at least one processor coupled to the memory is further configured to transmit a configuration recommendation comprising the bit split.

2. The apparatus of claim 1, wherein the one or more RS resources are associated with one or more RSs including at least one of channel state information (CSI) reference signals (RSs) (CSI-RSs), demodulation reference signals (DMRSs), sounding reference signals (SRSs), or a physical random access channel (PRACH).

3. The apparatus of claim 1, wherein the one or more first bits are associated with at least one of one or more UL or DL beams, one or more subcarriers, one or more frequency locations, or one or more time symbols.

4. The apparatus of claim 1, wherein the one or more second bits are associated with at least one of an RS sequence, an RS port, an RS density or comb structure, a time domain (TD) or a frequency domain (FD) allocation, or a resource mapping.

5. The apparatus of claim 1, wherein the at least one processor is configured to activate or deactivate the at least one of the one or more RS resources based on the one or more first bits.

6. The apparatus of claim 5, wherein the activated or deactivated at least one of the one or more RS resources is at least one of one or more UL or DL beams, one or more subcarriers, one or more frequency locations, or one or more time symbols.

7. The apparatus of claim 1, wherein the at least one processor is configured to select a configuration of the at least one of the one or more RS resources based on the one or more second bits.

8. The apparatus of claim 7, wherein the selected configuration of the at least one of the one or more RS resources is at least one of an RS sequence, an RS port, an RS density or comb structure, a time domain (TD) or a frequency domain (FD) allocation, or a resource mapping.

9. The apparatus of claim 1, wherein the at least one processor is configured to periodically transmit, to the base station, or periodically receive, from the base station, one or more RSs based on the selected at least one of the one or more RS resources.

10. The apparatus of claim 1, wherein the plurality of UL or DL information bits include both the one or more first bits and the one or more second bits, and both the one or more first bits and the one or more second bits comprise control information of one or more predefined control information types.

11. The apparatus of claim 1, wherein the plurality of UL or DL information bits include both the one or more first bits and the one or more second bits, and the one or more first bits comprise one or more control information types associated with control information comprised in the plurality of UL or DL information bits, and the one or more second bits comprise the control information.

12. The apparatus of claim 1, further comprising a transceiver coupled to the at least one processor, wherein the one or more RS resources comprise an indication of use or nonuse of the index modulation technique.

13. A method of wireless communication at a user equipment (UE), comprising:
receiving, from a base station, a configuration of one or more reference signal (RS) resources of an RS resource set, the one or more RS resources being associated with an index modulation technique including a plurality of uplink (UL) or downlink (DL) information bits; and
transmitting, to the base station, or receive, from the base station, the plurality of UL or DL information bits, the plurality of UL or DL information bits including at least one of one or more first bits or one or more second bits,
at least one of the one or more RS resources being selected based on at least one of the one or more first bits or the one or more second bits, wherein the configuration comprises a bit split within the plurality of UL or DL information bits of the at least one of the one or more first bits or the one or more second bits or further comprising transmitting a configuration recommendation comprising the bit split.

14. An apparatus for wireless communication at a base station, comprising:
memory; and
at least one processor coupled to the memory and configured to:
configure one or more reference signal (RS) resources of an RS resource set based on a configuration of the one or more RS resources of the RS resource set, the one or more RS resources being associated with an index modulation technique including a plurality of downlink (DL) or uplink (UL) information bits; and
transmit, to a user equipment (UE), or receive, from the UE, the plurality of DL or UL information bits, the plurality of DL or UL information bits including at least one of one or more first bits or one or more second bits,
at least one of the one or more RS resources being selected based on at least one of the one or more first bits or the one or more second bits, wherein the configuration comprises a bit split within the plurality of UL or DL information bits of the at least one of the one or more first bits or the one or more second bits or wherein the at least one processor coupled to the memory is further configured to receive a configuration recommendation comprising the bit split.

15. The apparatus of claim 14, wherein the one or more RS resources are associated with one or more RSs including at least one of channel state information (CSI) reference signals (RSS) (CSI-RSs), demodulation reference signals (DMRSs), sounding reference signals (SRSs), or a physical random access channel (PRACH).

16. The apparatus of claim 14, wherein the one or more first bits are associated with at least one of one or more DL or UL beams, one or more subcarriers, one or more frequency locations, or one or more time symbols.

17. The apparatus of claim 14, wherein the one or more second bits are associated with at least one of an RS sequence, an RS port, an RS density or comb structure, a time domain (TD) or a frequency domain (FD) allocation, or a resource mapping.

18. The apparatus of claim 14, wherein the at least one processor is configured to activate or deactivate the at least one of the one or more RS resources based on the one or more first bits.

19. The apparatus of claim 18, wherein the activated or deactivated at least one of the one or more RS resources is at least one of one or more DL or UL beams, one or more subcarriers, one or more frequency locations, or one or more time symbols.

20. The apparatus of claim 14, wherein the at least one processor is configured to select a configuration of the at least one of the one or more RS resources based on the one or more second bits.

21. The apparatus of claim 14, wherein the selected configuration of the at least one of the one or more RS resources is at least one of an RS sequence, an RS port, an RS density or comb structure, a time domain (TD) or a frequency domain (FD) allocation, or a resource mapping.

22. The apparatus of claim 14, wherein the at least one processor is configured to periodically transmit, to the UE, or periodically receive, from the UE, one or more RSs based on the selected at least one of the one or more RS resources.

23. The apparatus of claim 14, wherein to configure the one or more RS resources of the RS resource set, the at least one processor is configured to: transmit, to the UE, the configuration of the one or more RS resources of the RS resource set.

24. The apparatus of claim 14, wherein the plurality of DL or UL information bits include both the one or more first bits and the one or more second bits, and both the one or more first bits and the one or more second bits comprise control information of one or more predefined control information types.

25. The apparatus of claim 14, wherein the plurality of DL or UL information bits include both the one or more first bits and the one or more second bits, and the one or more first bits comprise one or more control information types associated with control information comprised in the plurality of DL or UL information bits, and the one or more second bits comprise the control information.

26. The apparatus of claim 14, further comprising a transceiver coupled to the at least one processor, wherein the one or more RS resources comprise an indication of use or nonuse of the index modulation technique.

27. A method of wireless communication at a base station, comprising:
configuring one or more reference signal (RS) resources of an RS resource set based on a configuration of the one or more RS resources of the RS resource set, the one or more RS resources being associated with an index modulation technique including a plurality of downlink (DL) or uplink (UL) information bits; and
transmitting, to a user equipment (UE), or receive, from the UE, the plurality of DL or UL information bits, the plurality of DL or UL information bits including at least one of one or more first bits or one or more second bits,
at least one of the one or more RS resources being selected based on at least one of the one or more first bits or the one or more second bits, wherein the configuration comprises a bit split within the plurality of UL or DL information bits of the at least one of the one or more first bits or the one or more second bits or further comprising a configuration recommendation comprising the bit split.

* * * * *